United States Patent
Zhang et al.

(10) Patent No.: US 9,443,668 B2
(45) Date of Patent: Sep. 13, 2016

(54) ELECTRICAL SWITCHING APPARATUS, AND STORED ENERGY ASSEMBLY AND TORQUE REGULATOR ASSEMBLY THEREFOR

(71) Applicant: EATON CORPORATION, Cleveland, OH (US)

(72) Inventors: Kaizhi Zhang, Shanghai (CN); Li Yu, Shanghai (CN); Chao Yang, Shenzhen (CN); Caiying Ding, Shenzhen (CN)

(73) Assignee: EATON CORPORATION, Cleveland, OH (US)

( * ) Notice: Subject to any disclaimer, the term of this patent is extended or adjusted under 35 U.S.C. 154(b) by 208 days.

(21) Appl. No.: 14/302,533

(22) Filed: Jun. 12, 2014

(65) Prior Publication Data

US 2015/0364269 A1 Dec. 17, 2015

(51) Int. Cl.
| | |
|---|---|
| *H01H 3/40* | (2006.01) |
| *H01H 3/30* | (2006.01) |
| *H01H 3/58* | (2006.01) |
| *F16D 7/02* | (2006.01) |
| *F16H 35/10* | (2006.01) |
| *H01H 5/06* | (2006.01) |
| *F16D 13/04* | (2006.01) |
| *F16D 43/20* | (2006.01) |
| *H01H 3/32* | (2006.01) |

(52) U.S. Cl.
CPC ............... *H01H 3/40* (2013.01); *F16D 7/024* (2013.01); *F16H 35/10* (2013.01); *H01H 3/3005* (2013.01); *H01H 3/3031* (2013.01); *H01H 3/3042* (2013.01); *H01H 3/58* (2013.01); *H01H 5/06* (2013.01); *F16D 13/04* (2013.01); *F16D 43/20* (2013.01); *H01H 2003/3063* (2013.01); *H01H 2003/326* (2013.01); *H01H 2235/01* (2013.01)

(58) Field of Classification Search
CPC ............ H01H 3/40; H01H 5/00; H01H 3/30; H01H 75/00
USPC ................................. 200/400, 401, 424, 244
See application file for complete search history.

(56) References Cited

U.S. PATENT DOCUMENTS

| | | |
|---|---|---|
| 5,358,073 A | 10/1994 | Woethrich |
| 5,938,008 A | 8/1999 | Wehrli, III et al. |
| 6,486,758 B1 | 11/2002 | Olszewski et al. |
| 7,598,468 B2 | 10/2009 | Chen et al. |
| 7,696,447 B2 | 4/2010 | Chen et al. |
| 2004/0104106 A1 | 6/2004 | Peter |

OTHER PUBLICATIONS

European Patent Office, International Search Report and Written Opinion for PCT/US2015/025294, Jul. 20, 2015, 9 pp.

*Primary Examiner* — Edwin A. Leon
*Assistant Examiner* — Iman Malakooti
(74) *Attorney, Agent, or Firm* — Eckert Seamans Cherin & Mellott, LLC; John P. Powers; Grant E. Coffield

(57) ABSTRACT

A torque regulator assembly is for a stored energy assembly of an electrical switching apparatus. The torque regulator assembly includes: a drive assembly including a gear and a transfer assembly disposed on the gear, the gear being structured to be cooperable with at least one charging mechanism of the stored energy assembly; and a shaft extending through the gear. The drive assembly is structured to move between a driving position and a non-driving position. In the driving position, the gear is cooperable with the transfer assembly to drive the shaft. In the non-driving position, the gear rotates independently with respect to the transfer assembly.

19 Claims, 7 Drawing Sheets ated shaft, there is thus room for improvement in electrical switching apparatus, and in stored energy assemblies and torque regulator assemblies therefor.

ELECTRICAL SWITCHING APPARATUS, AND STORED ENERGY ASSEMBLY AND TORQUE REGULATOR ASSEMBLY THEREFOR

BACKGROUND

1. Field

The disclosed concept pertains generally to electrical switching apparatus such as for example, circuit breakers. The disclosed concept also pertains to stored energy assemblies for electrical switching apparatus. The disclosed concept further relates to torque regulator assemblies for stored energy assemblies.

2. Background Information

Electrical switching apparatus, such as circuit breakers, provide protection for electrical systems from electrical fault conditions such as, for example, current overloads, short circuits, abnormal voltage and other fault conditions. Typically, circuit breakers include an operating mechanism which opens electrical contact assemblies to interrupt the flow of current through the conductors of an electrical system in response to such fault conditions as detected, for example, by a trip unit.

Some medium voltage circuit breakers, for example, employ a spring-operated stored energy assembly. Specifically, the operating mechanism of such circuit breakers typically includes an opening assembly having at least one spring which facilitates the opening (e.g., separation) of the electrical contact assemblies, a closing assembly including a number of springs that close the electrical contact assemblies, and a charging mechanism for charging the spring(s). The contact assemblies are closed by releasing the stored energy of the closing assembly spring(s). The closing assembly spring(s) is/are charged either manually, using a manual charging mechanism such as, for example, a charging handle, or automatically using, for example, a motor-driven charging mechanism or other suitable electromechanical charging mechanism. Each of the manual and automatic charging mechanisms of known stored energy assemblies requires its own individual "chain" or assembly of components, in order to link the corresponding power source (e.g., human power; motor power) to the spring(s) that must be charged. There are numerous components in each of these assemblies, some of which are relatively complex to make and/or are difficult to install or assemble. Additionally, in operation, components of known stored energy assemblies can become unintentionally overloaded.

There is thus room for improvement in electrical switching apparatus, and in stored energy assemblies and torque regulator assemblies therefor.

SUMMARY

These needs and others are met by embodiments of the disclosed concept wherein a torque regulator assembly is provided which among other benefits, regulates the amount of energy transferred to a stored energy mechanism by a charging mechanism, in a stored energy assembly of an electrical switching apparatus.

In accordance with one aspect of the disclosed concept, a torque regulator assembly for a stored energy assembly of an electrical switching apparatus is provided. The electrical switching apparatus includes a housing, separable contacts, and an operating mechanism for opening and closing the separable contacts. The stored energy assembly includes a mount removably coupled to the housing, a transmission assembly disposed on the mount and comprising a stored energy mechanism, and at least one charging mechanism structured to charge the stored energy mechanism in order to store energy. The torque regulator assembly comprises: a drive assembly comprising a gear and a transfer assembly disposed on the gear, the gear being structured to be cooperable with the at least one charging mechanism; and a shaft extending through the gear. The drive assembly is structured to move between a driving position and a non-driving position. In the driving position, the gear is cooperable with the transfer assembly to drive the shaft. In the non-driving position, the gear rotates independently with respect to the transfer assembly.

As another aspect of the disclosed concept, a stored energy assembly for an electrical switching apparatus is provided. The electrical switching apparatus includes a housing, separable contacts, and an operating mechanism for opening and closing the separable contacts. The stored energy assembly comprises: a mount structured to be removably coupled to the housing; a transmission assembly disposed on the mount, the transmission assembly comprising a stored energy mechanism; and at least one charging mechanism for charging the stored energy mechanism in order to store energy; and a torque regulator assembly comprising: a drive assembly comprising a gear and a transfer assembly disposed on the gear, the gear being cooperable with the at least one charging mechanism, and a shaft extending through the gear. The drive assembly is structured to move between a driving position and a non-driving position. In the driving position, the gear is cooperable with the transfer assembly to drive the shaft. In the non-driving position, the gear rotates independently with respect to the transfer assembly.

As a further aspect of the disclosed concept, an electrical switching apparatus comprises: a housing; separable contacts; an operating mechanism for opening and closing the separable contacts; and a stored energy assembly comprising: a mount removably coupled to the housing, a transmission assembly disposed on the mount and comprising a stored energy mechanism, at least one charging mechanism structured to charge the stored energy mechanism in order to store energy, and a torque regulator assembly comprising: a drive assembly comprising a gear and a transfer assembly disposed on the gear, the gear being cooperable with the at least one charging mechanism, and a shaft extending through the gear. The drive assembly is structured to move between a driving position and a non-driving position. In the driving position, the gear is cooperable with the transfer assembly to drive the shaft. In the non-driving position, the gear rotates independently with respect to the transfer assembly.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1A:
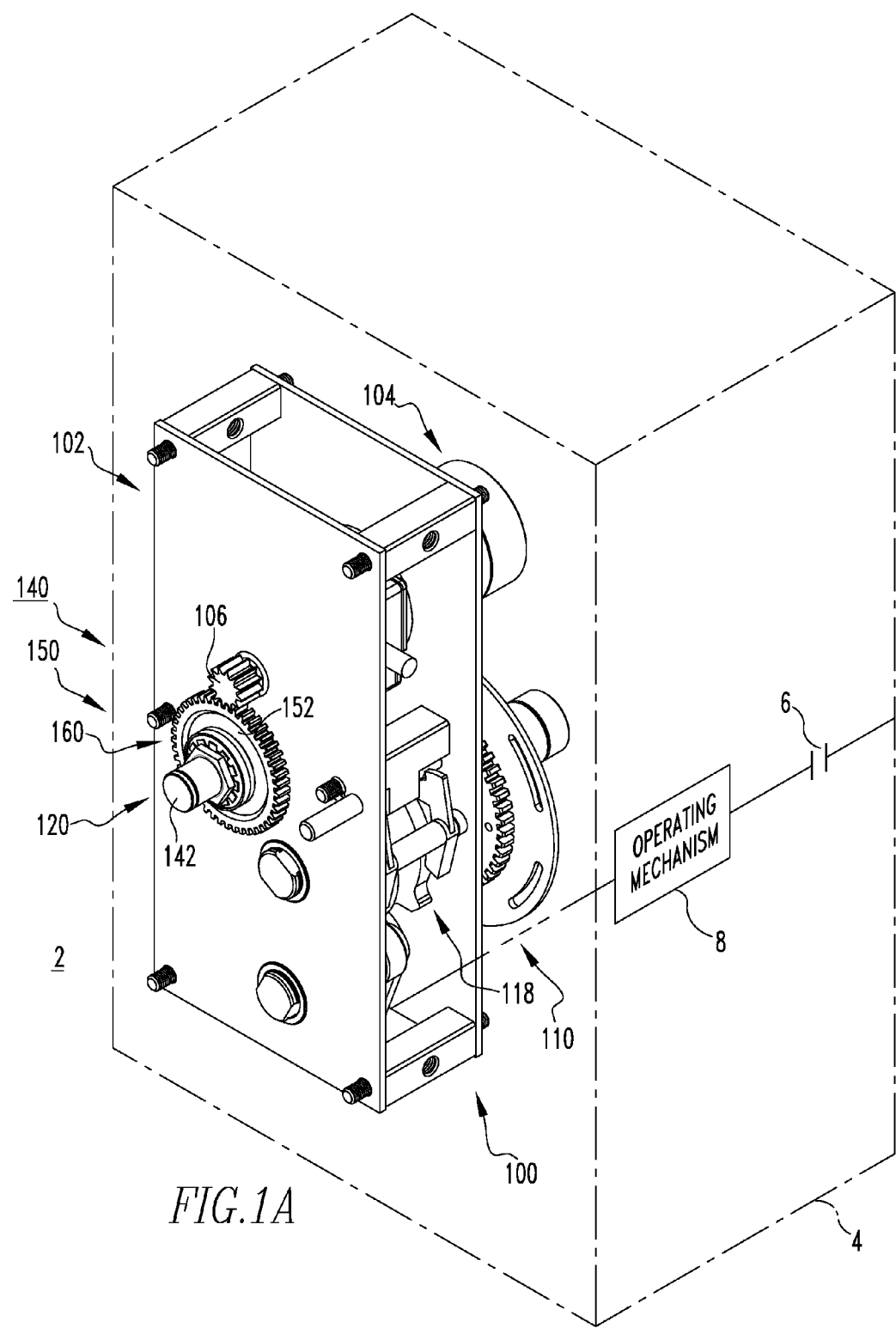
FIG. 1A is a simplified view of an electrical switching apparatus, and a portion of a stored energy assembly and torque regulator assembly therefor, in accordance with an embodiment of the disclosed concept.

FIG. 1A shows an isometric view of an electrical switching apparatus (e.g., without limitation, medium voltage vacuum circuit breaker 2) (partially shown in simplified form) in accordance with a non-limiting embodiment of the disclosed concept. In the example of FIG. 1A, the circuit breaker 2 includes a housing 4, a pair of separable contacts 6 (shown in simplified form), and an operating mechanism 8 (shown in simplified form) for opening and closing the separable contacts 6. The circuit breaker 2 further includes a stored energy assembly 100 (partially shown) that has a mount 102 removably coupled to the housing 4 of the circuit breaker 2. The stored energy assembly 100 includes a charging mechanism (e.g., without limitation, motor 104) and a transmission assembly 110 located on the mount 102. In operation, and as will be discussed in greater detail hereinbelow, the transmission assembly 110 cooperates with the motor 104 to transfer energy into movement of the operating mechanism 8 in order to open or close the separable contacts 6.

Figure 1B:
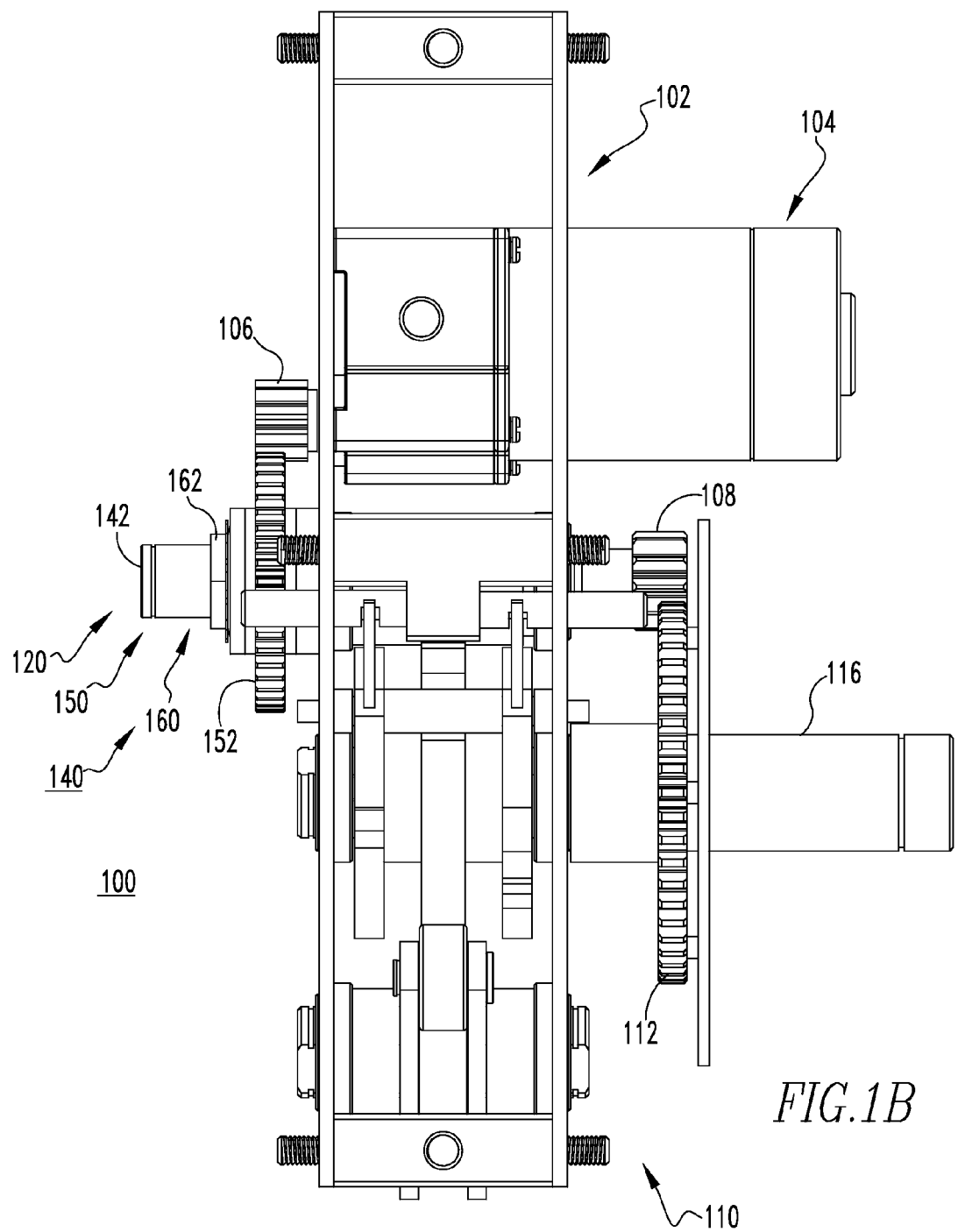
FIG. 1B is an elevation view of the stored energy assembly of FIG. 1.
Figure 1C:
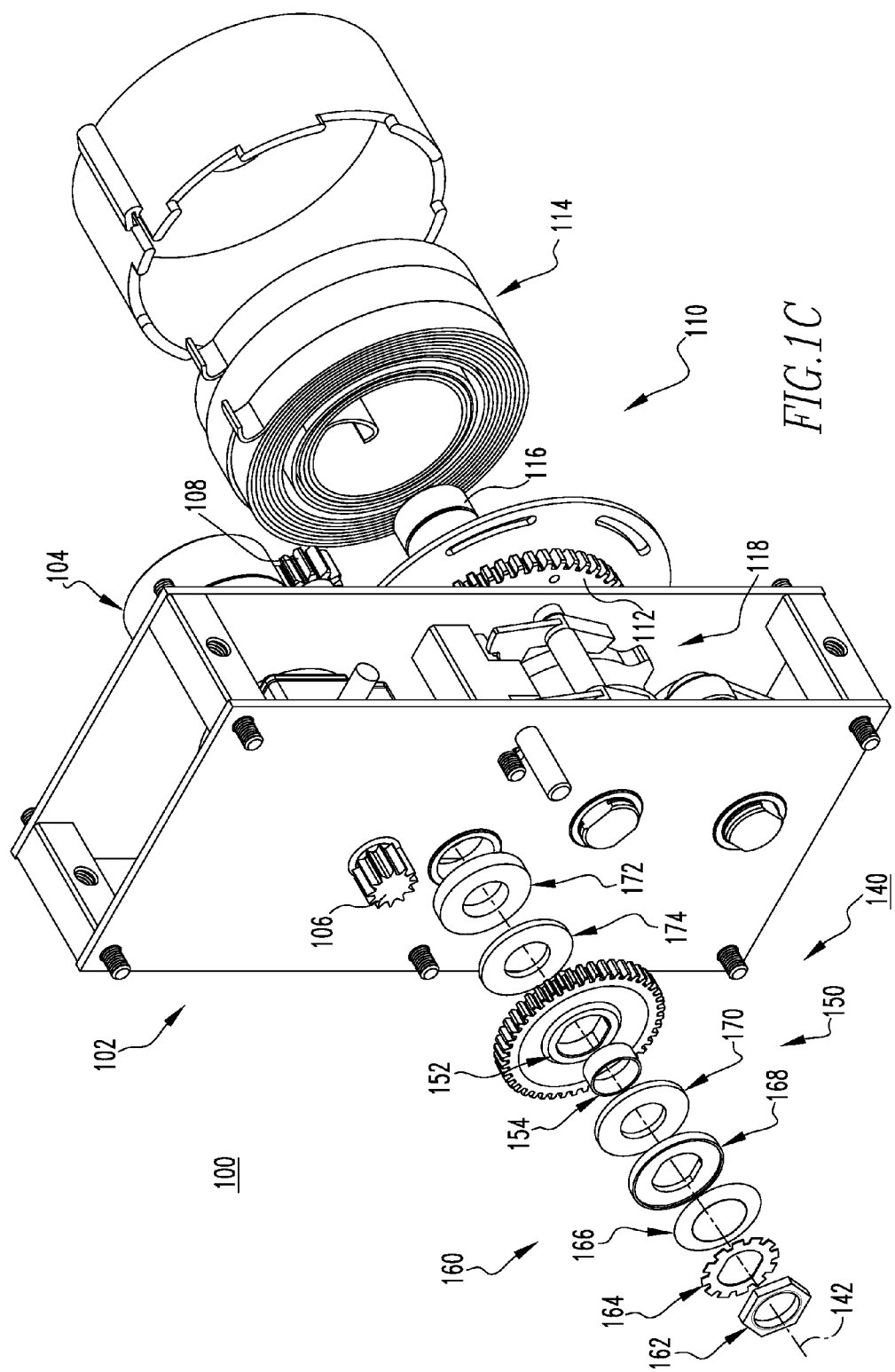
FIG. 1C is an exploded isometric view of the stored energy assembly of FIGS. 1A and 1B, shown as employed with a stored energy mechanism.

FIGS. 1B and 1C partially show the stored energy assembly 100. The stored energy assembly 100 includes a driving pinion gear 106 coupled to the motor 104, and a torque regulator assembly 140 cooperable with the driving pinion gear 106. Furthermore, the stored energy assembly 100 has an intermediate pinion gear 108 cooperable with each of the torque regulator assembly 140 and the transmission assembly 110. Referring to FIG. 1C, the transmission assembly 110 includes a transmission gear 112, a stored energy mechanism (e.g., without limitation, spiral spring 114), and a main shaft 116 extending through each of the transmission gear 112 and the spiral spring 114. Furthermore, as seen, the mount 102 is located between the regulator gear 152 and the transmission gear 112. Thus, by employing such a configuration, and also by employing the spiral spring 114, the stored energy assembly 100 is advantageously able to be more compact. It will, however, be appreciated that the spiral spring 114 and/or the torque regulator assembly 140 may be employed with any suitable alternative stored energy assembly (not shown), without departing from the scope of the disclosed concept.

Referring to FIG. 1B, the example torque regulator assembly 140 includes an intermediate shaft 142 and a drive assembly 150 that has a regulator gear 152, a bushing 154, and a transfer assembly 160. The bushing 154 is structured to be located in the center of the regulator gear 152 and the transfer assembly 160 is located on the regulator gear 152. Furthermore, the intermediate shaft 142 extends through the regulator gear 152.

In operation, the motor 104 is structured to drive the driving pinion gear 106, thus causing the corresponding regulator gear 152 to rotate. It follows that the regulator gear 152 is cooperable with the motor 104. As will be discussed in greater detail hereinbelow, as the regulator gear 152 rotates due to the driving pinion gear 106, the regulator gear 152 may or may not cause the intermediate pinion gear 108, as well as the transmission gear 112, to rotate. When the regulator gear 152 causes the intermediate pinion gear 108 and the transmission gear 112 to rotate, the motor 104 is able to transfer energy to and charge the spiral spring 114 (FIG. 1C).

Continuing to refer to FIG. 1C, the transmission assembly 110 further includes a number of cams 118 cooperable with each of the main shaft 116 and the operating mechanism 8 (FIG. 1A) of the circuit breaker 2 (FIG. 1A). Upon being released (e.g., when the spiral spring 114 moves from a charged position to a discharged position), the spiral spring 114 cooperates with the cams 118 to force the operating mechanism 8 (FIG. 1A) to open or close the separable contacts 6 (FIG. 1A). Furthermore, the stored energy assembly 100 includes a single-direction bearing 120 located in the middle of the intermediate shaft 142, which is structured to permit the gears 106, 108, 112, 152 to be operable in one direction.

As seen in FIG. 1C, the transfer assembly 160 of the torque regulator assembly 140 includes a locking member (e.g., without limitation, nut 162) and a number of transfer components (e.g., without limitation, lock washer 164, disc spring 166, pressure plate member 168 and driving friction facing 170) located on the intermediate shaft 142 between the nut 162 and the regulator gear 152. As seen, the lock washer 164 is located between the nut 162 and the disc spring 166. Additionally, the disc spring 166 is located between the lock washer 164 and the pressure plate member 168. Furthermore, the pressure plate member 168 is located between the disc spring 166 and the driving friction facing 170. Moreover, the driving friction facing 170 is located on the regulator gear 152 and is between the pressure plate member 168 and the regulator gear 152. To support the regulator gear 152, the transfer assembly 160 further includes a hub component 172 and a support friction facing 174 located between the regulator gear 152 and the hub component 172. Each of the hub component 172 and the support friction facing 174 is located between the regulator gear 152 and the mount 102 of the stored energy assembly 100. It is also within the scope of the disclosed concept for the transfer assembly 160 to include additional or fewer components and still perform the desired transfer function, as will be discussed in greater detail hereinbelow.

Referring to FIG. 1B, the nut 162 is fixedly connected with the intermediate shaft 142 (e.g., without limitation, threadably connected). Additionally, each of the lock washer 164, the disc spring 166, the pressure plate member 168, the driving friction facing 170, the hub component 172 and the support friction facing 174 is able to rotate independently with respect to the regulator gear 152. In other words, the regulator gear 152, when driven by the motor 104, may rotate together with, or may rotate independently with respect to, each of the lock washer 164, the disc spring 166, the pressure plate member 168, the driving friction facing 170, the hub component 172 and the support friction facing 174. In this manner, the drive assembly 150 is structured to move between a driving position and a non-driving position.

The regulator gear 152, which is located between the friction facings 170, 174, is cooperable with and rotates together with each of the lock washer 164, the disc spring 166, the pressure plate member 168, the driving friction facing 170, the hub component 172 and the support friction facing 174, in the driving position. In the non-driving position, the regulator gear 152 is not cooperable with and rotates independently with respect to each of the lock washer 164, the disc spring 166, the pressure plate member 168, the driving friction facing 170, the hub component 172, and the support friction facing 174. In other words, in the driving position, the regulator gear 152 and each of the lock washer 164, the disc spring 166, the pressure plate member 168, the driving friction facing 170, the hub component 172 and the support friction facing 174 move at the same rotational velocity with respect to the intermediate shaft 142. Conversely, in the non-driving position, the regulator gear 152 and each of the lock washer 164, the disc spring 166, the pressure plate member 168, the driving friction facing 170, the hub component 172 and the support friction facing 174 move at different rotational velocities with respect to the intermediate shaft 142. Additionally, by virtue of the friction between the components of the drive assembly 150, the regulator gear 152 is advantageously able to drive the intermediate shaft 142. Thus, in the driving position, the regulator gear 152 is cooperable with the transfer assembly to advantageously drive the intermediate shaft 142, and in the non-driving position, the regulator gear 152 rotates independently with respect to the transfer assembly 160.

More specifically, the driving friction facing 170 exerts a force against the regulator gear 152. As the regulator gear 152 rotates, friction between the driving friction facing 170 and the regulator gear 152 causes the driving friction facing 170 to rotate together with the regulator gear 152. Likewise, friction between the driving friction facing 170 and the pressure plate member 168 causes the pressure plate member 168 to rotate together with the driving friction facing 170 and the regulator gear 152. Similarly, friction between the disc spring 166 and the pressure plate member 168 causes the disc spring 166 to rotate together with each of the pressure plate member 168, the driving friction facing 170 and the regulator gear 152. Furthermore, friction between the lock washer 164 and the disc spring 166 causes the lock washer 164 to rotate together with the disc spring 166, the pressure plate member 168, the driving friction facing 170 and the regulator gear 152. As mentioned hereinabove, the nut 162 is fixedly connected with the intermediate shaft 142 (shown in FIGS. 1A, 1B, and in phantom line drawing in FIG. 1C). In a similar manner as just described, friction between the lock washer 164 and the nut 162 causes the nut 162 to rotate together with the lock washer 164, the disc spring 166, the pressure plate member 168, the driving friction facing 170 and the regulator gear 152. Thus, as the regulator gear 152 rotates in the driving position, the transfer assembly 160 advantageously enables the intermediate shaft 142 which is fixedly connected with the nut 162, to rotate.

As described hereinabove, as the intermediate shaft 142 rotates, energy is transferred to and charges the spiral spring 114. However, the spiral spring 114, which has a predetermined torque limit, exerts a reaction torque on the intermediate shaft 142. As the spiral spring 114 is charged, the torque from the drive assembly 150 and the reaction torque from the spiral spring 114 exert opposing torques on the intermediate shaft 142. Furthermore, as the predetermined torque limit on the spiral spring 114 is reached, the reaction torque from the spiral spring 114 on the intermediate shaft 142 will exceed the torque from the drive assembly 150 on the intermediate shaft 142. At this moment, and in order to make sure additional energy is not transferred to the spiral spring 114, the drive assembly 150 advantageously moves from the driving position to a non-driving position.

In the non-driving position, because the torque from the drive assembly 150 on the intermediate shaft 142 cannot overcome the reaction torque from the spiral spring 114, the regulator gear 152 will rotate independently with respect to the transfer assembly 160. More specifically, the regulator gear 152 in the non-driving position will rotate independently with respect to and at a different rotational velocity than the lock washer 164, the disc spring 166, the pressure plate member 168, the driving friction facing 170, the hub component 172 and the support friction facing 174. It follows that in the non-driving position, the motor 104 does not charge the spiral spring 114, whereas in the driving position the motor 104 does charge the spiral spring 114. Thus, by employing the torque regulator assembly 140 in the stored energy assembly 100, additional energy is advantageously not transferred to the spiral spring 114 when the predetermined torque limit of the spiral spring 114 is reached. In other words, the torque regulator assembly safely and reliably allows the motor 104 to transfer energy to and charge the spiral spring 114.

Figure 2:
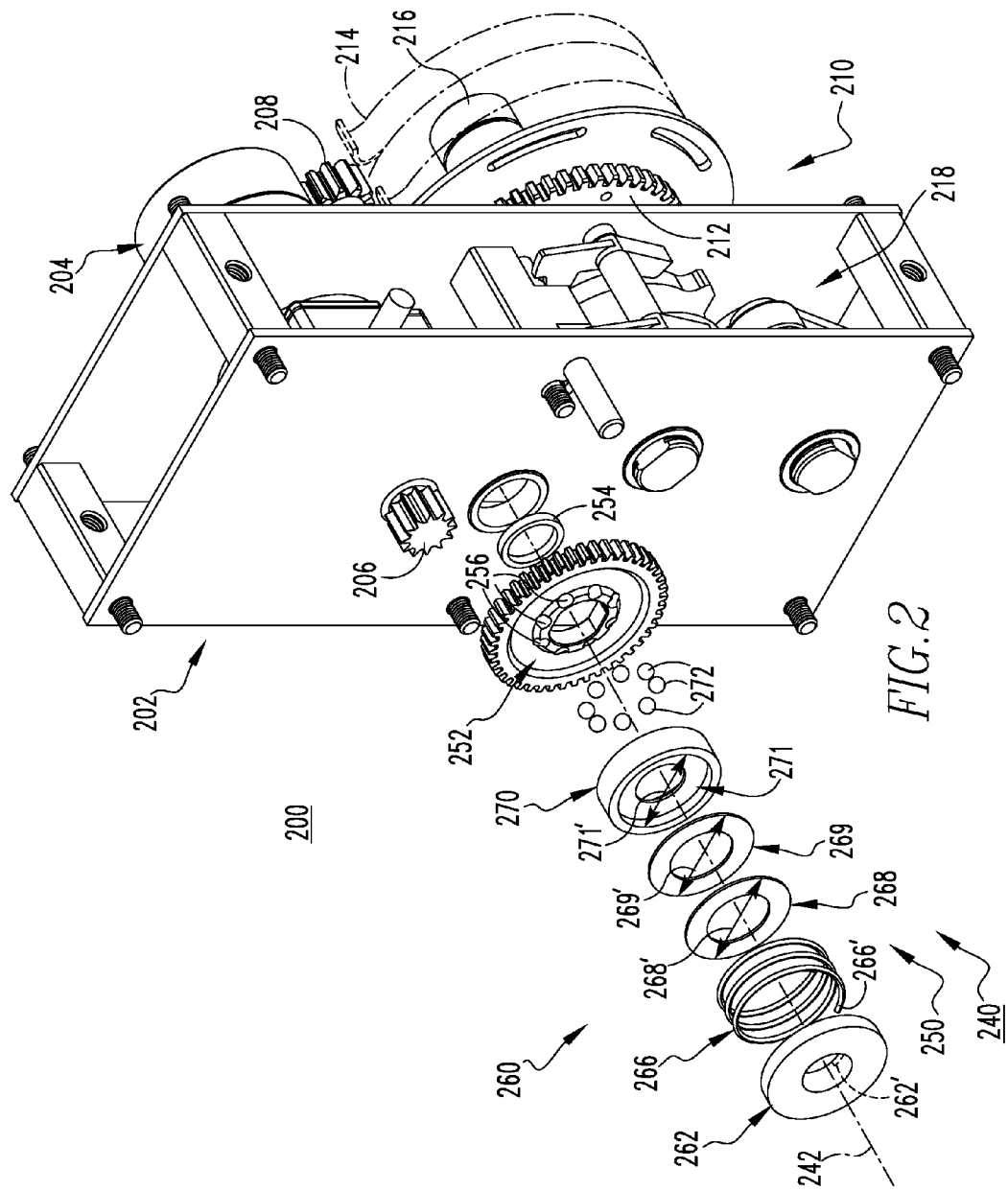
FIG. 2 is an exploded isometric view of a portion of a stored energy assembly, in accordance with another embodiment of the disclosed concept.

FIG. 2 shows a portion of a stored energy assembly 200 that may replace the aforementioned stored energy assembly 100 in the circuit breaker 2 (FIG. 1A) in accordance with a non-limiting alternative embodiment of the disclosed concept. In the example of FIG. 2, the stored energy assembly 200 includes a mount 202 structured to be removably coupled to the housing 4 (FIG. 1A), a charging mechanism (e.g., without limitation, motor 204), and a driving pinion gear 206 coupled to the motor 204. The stored energy assembly further includes an intermediate pinion gear 208 and a torque regulator assembly 240 cooperable with each of the driving pinion gear 206 and the intermediate pinion gear 208.

Furthermore, the stored energy assembly 200 includes a transmission assembly 210 located on the mount 202. The transmission assembly 210 has a transmission gear 212 cooperable with the intermediate pinion gear 208. The transmission assembly 210 further includes a stored energy mechanism (e.g., spiral spring 214 (shown in phantom line drawing)), a main shaft 216 extending through each of the transmission gear 212 and the spiral spring 214, and a number of cams 218 structured to be cooperable with each of the main shaft 216 and the operating mechanism 8 (FIG. 1A) of the circuit breaker 2 (FIG. 1A). Additionally, as seen, the mount 202 is located between the regulator gear 252 and the transmission gear 212. Thus, by employing such a configuration, and also by employing the spiral spring 214, the stored energy assembly 200 is advantageously able to be more compact. It will however be appreciated that the spiral spring 214 and/or the torque regulator assembly 240 may be employed with any suitable alternative stored energy assembly (not shown), without departing from the scope of the disclosed concept.

In operation, the motor 204 is structured to transfer energy to and charge the spiral spring 214 which, upon being released, is structured to move the operating mechanism 8 (FIG. 1A) to advantageously open or close the separable contacts 6 (FIG. 1A) of the circuit breaker 2 (FIG. 1A). Continuing to refer to FIG. 2, the torque regulator assembly 240 includes an intermediate shaft 242 (shown in phantom line drawing) and a drive assembly 250. The drive assembly 250 has a regulator gear 252, a bushing 254 structured to be located in the regulator gear 252, and a transfer assembly 260 located on the regulator gear 252. Furthermore, the intermediate shaft 242 extends through the regulator gear 252.

In operation, the motor 204 is structured to drive the driving pinion gear 206 and the corresponding regulator gear 252. Thus, the regulator gear 252 is cooperable with the motor 204. Furthermore, although not shown, the stored energy assembly 200 includes a single-direction bearing located in the middle of the intermediate shaft 242, which is structured to permit the gears 206, 208, 212, 252 to be operable in one direction. Additionally, similar to the drive assembly 150 of the stored energy assembly 100, the drive assembly 250 of the stored energy assembly 200 is structured to move between a driving position and a non-driving position. In the driving position, the regulator gear 252 is cooperable with the transfer assembly 260 to drive the intermediate shaft 242. In the non-driving position, the regulator gear 252 rotates independently with respect to the transfer assembly 260.

The transfer assembly 260 includes a locking member (e.g., without limitation, nut 262) fixedly connected (e.g., without limitation, threadably connected) with the intermediate shaft 242 and a number of transfer components (e.g., without limitation, spring 266, plate members 268, 269, and bearing 270) located on the intermediate shaft 242 between the regulator gear 252 and the nut 262. The spring 266 is located between the nut 262 and the plate members 268, 269. Additionally, the plate members are located between the spring 266 and the bearing 270. Furthermore, the bearing 270 is located between the plate members 268, 269 and the regulator gear 252. It is also within the scope of the disclosed concept for the transfer assembly 260 to include additional or fewer components and still perform the desired transfer function, as will be discussed in greater detail hereinbelow. For example and without limitation, the transfer assembly 260 may include a hub component (not shown) substantially similar to the hub component 172 of the transfer assembly 160. Thus, the regulator gear 252 may be located between a hub component (not shown) and the bearing 270, in order to provide additional support for the regulator gear 252.

In operation, the regulator gear 252 is structured to rotate together with or independently with respect to the nut 262, the spring 266, the plate members 268, 269, and the bearing 270. As seen, the regulator gear 252 includes a number of recesses (e.g., without limitation, partially spherical-shaped grooves 256) and the bearing 270 includes a number of rolling components (e.g., without limitation, spherical-shaped balls 272). In the driving position, each of the balls 272 is structured to be located in a corresponding one of the grooves 256. Similar to the transfer assembly 160 of the stored energy assembly 100, the close connection between the transfer components (e.g., without limitation, spring 266, plate members 268, 269, bearing 270) and the regulator gear 252 enables energy to be transferred from the regulator gear 252 through the transfer assembly 260 to drive the intermediate shaft 242.

More specifically, friction between the regulator gear 252 and the transfer assembly 260 causes the intermediate shaft 242 to rotate. For example and without limitation, the transfer assembly 260 engages and exerts a force against the regulator gear 252. Thus, in the driving position, when each of the balls 272 of the bearing 270 are located in the grooves 256 of the regulator gear 252, friction between the regulator gear 252 and the bearing 270 causes the bearing 270 to rotate together with the regulator gear 252. Similar frictional forces between the plate members 268, 269 and the bearing 270 cause the plate members 268, 269 to rotate together with the bearing 270 and the regulator gear 252, in the driving position. As seen, the bearing 270 includes a cylindrical-shaped cutout 271 having a diameter 271'. Additionally, each of the plate members 268, 269 has a corresponding outer diameter 268', 269' substantially similar to the diameter 271' of the cutout 271. In this manner, each of the plate members 268, 269 is advantageously structured to be securely retained within the cutout 271 of the bearing 270. Furthermore, friction between the spring 266 and the plate member 268 causes the spring 266 to rotate together with the plate members 268, 269, the bearing 270 and the regulator gear 252. Continuing to refer to FIG. 2, the nut 262 includes a slot 262' (shown in hidden line drawing) and the spring 266 includes an end portion 266' structured to be located in the slot 262', as shown. Thus, the spring 266 is fixedly connected with the nut 262. In this manner, the slot-connection between the spring 266 and the nut 262 causes the nut 262 to rotate together with the spring 266, the plate members 268, 269, the bearing 270, and the regulator gear 252, in the driving position. Thus, because the nut 262 is fixedly connected with the intermediate shaft 242, the transfer assembly 260 is advantageously able to transfer energy from the regulator gear 252 to the intermediate shaft 242.

In operation, the stored energy assembly 200 and corresponding torque regulator assembly 240 function in a manner substantially similar to the stored energy assembly 100 (FIGS. 1A through 1C) and corresponding torque regulator assembly 140 (FIGS. 1A through 1C), described hereinabove. Thus, as the intermediate shaft 242 rotates, energy is transferred to and charges the spiral spring 214. However, the spiral spring 214, which has a predetermined torque limit, exerts a reaction torque on the intermediate shaft 242. As the spiral spring 214 is charged, the torque from the drive assembly 250 and the reaction torque from the spiral spring 114 exert opposing torques on the intermediate shaft 242. Furthermore, as the predetermined torque limit on the spiral spring 214 is reached, the reaction torque from the spiral spring 214 on the intermediate shaft 242 will exceed the torque from the drive assembly 250 on the intermediate shaft 242. At this moment, the drive assembly 250 advantageously moves from the driving position to a non-driving position and prevents additional energy from being transferred to the spiral spring 214.

In the non-driving position, because the torque from the drive assembly 250 on the intermediate shaft 242 cannot overcome the reaction torque from the spiral spring 214, the regulator gear 252 will rotate independently with respect to the transfer assembly 260. More specifically, the friction between the regulator gear 252 and the bearing 270 will be overcome and the regulator gear 252 will disengage and rotate independently with respect to the bearing 270, the plate members 268, 269, and the spring 266. In other words, the regulator gear 252 will rotate at a different rotational velocity than the bearing 270, the plate members 268, 269, and the spring 266, in the non-driving position. It follows that in the non-driving position, the motor 204 does not charge the spiral spring 214, whereas in the driving position the motor 204 does charge the spiral spring 214. Thus, by employing the torque regulator assembly 240 in the stored energy assembly 200, additional energy is advantageously not transferred to the intermediate shaft 242 when the predetermined torque limit of the spiral spring 214 is reached. In other words, the torque regulator assembly safely and reliably allows the motor 204 to transfer energy to and charge the spiral spring 214.

Figure 3A:
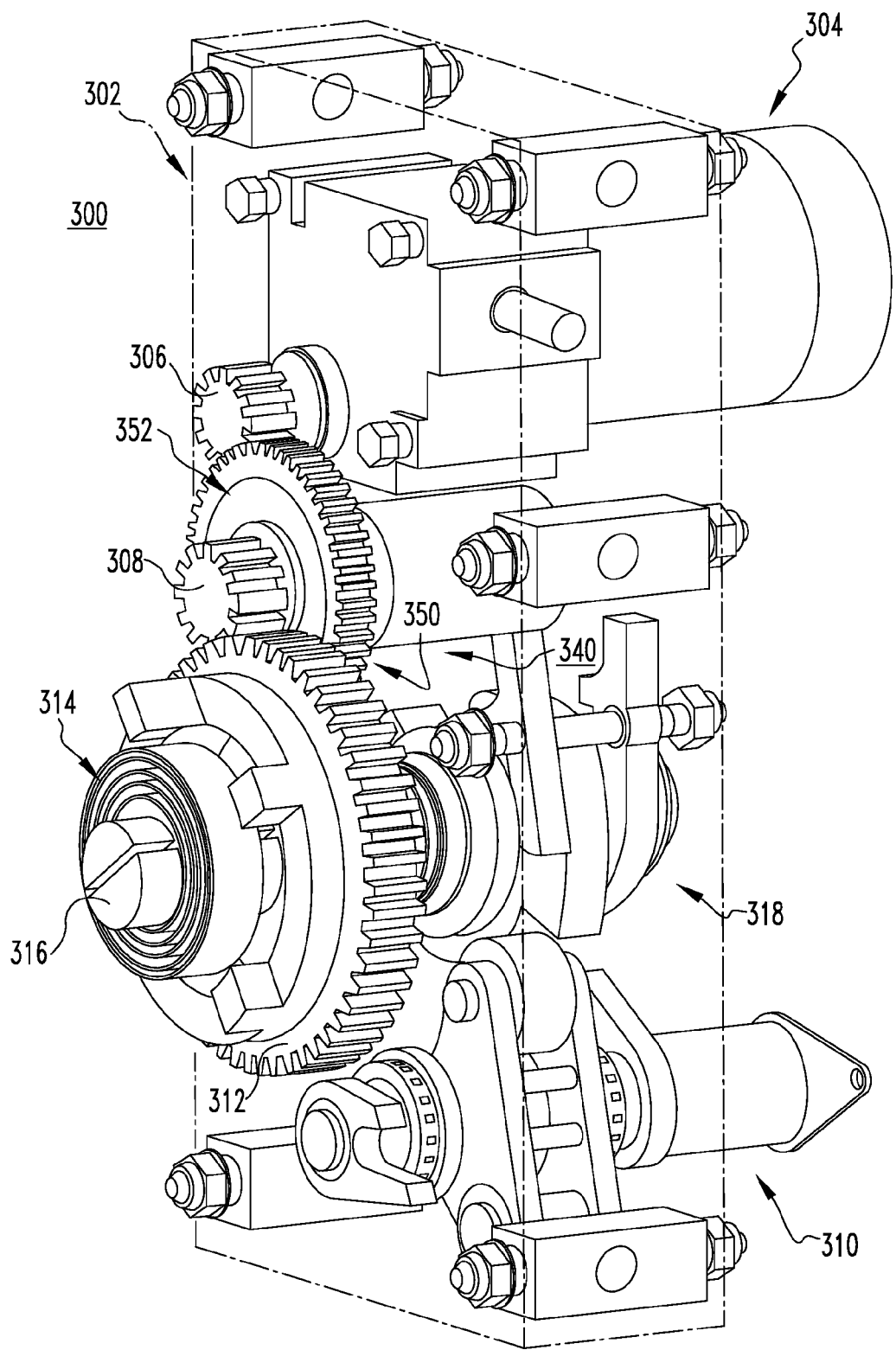
FIG. 3A is an isometric view of a portion of a stored energy assembly, in accordance with a further embodiment of the disclosed concept.

FIG. 3A shows a portion of a stored energy assembly 300 that may replace each of the aforementioned stored energy assemblies 100, 200 in accordance with a further non-limiting alternative embodiment of a disclosed concept. In the example of FIG. 3A, the stored energy assembly 300 includes a mount 302 (shown in phantom line drawing) structured to be removably coupled to the housing 4 (FIG. 1A), a charging mechanism (e.g., without limitation, motor 304), and a driving pinion gear 306 coupled to the motor 304. The stored energy assembly 300 further includes an intermediate pinion gear 308 and a torque regulator assembly 340 cooperable with each of the driving pinion gear 306 and the intermediate pinion gear 308.

Additionally, the stored energy assembly 300 has a transmission assembly 310 located on the mount 302. The transmission assembly has a transmission gear 312 cooperable with the intermediate pinion gear 308. The transmission assembly 310 further includes a stored energy mechanism (e.g., without limitation, spiral spring 314), a main shaft 316 extending through each of the transmission gear 312 and the spiral spring 314, and a number of cams 318 cooperable with each of the main shaft 316 and the operating mechanism 8 (FIG. 1A) of the circuit breaker 2 (FIG. 1A). In operation, the motor 304 cooperates with the driving pinion gear 306, the torque regulator assembly 340, and the intermediate pinion gear 308 to transfer energy to and charge the spiral spring 314. Upon being released, the spiral spring 314 is advantageously structured to move the operating mechanism 8 (FIG. 1A) to open or close the separable contacts 6 (FIG. 1A).

Figure 3B:
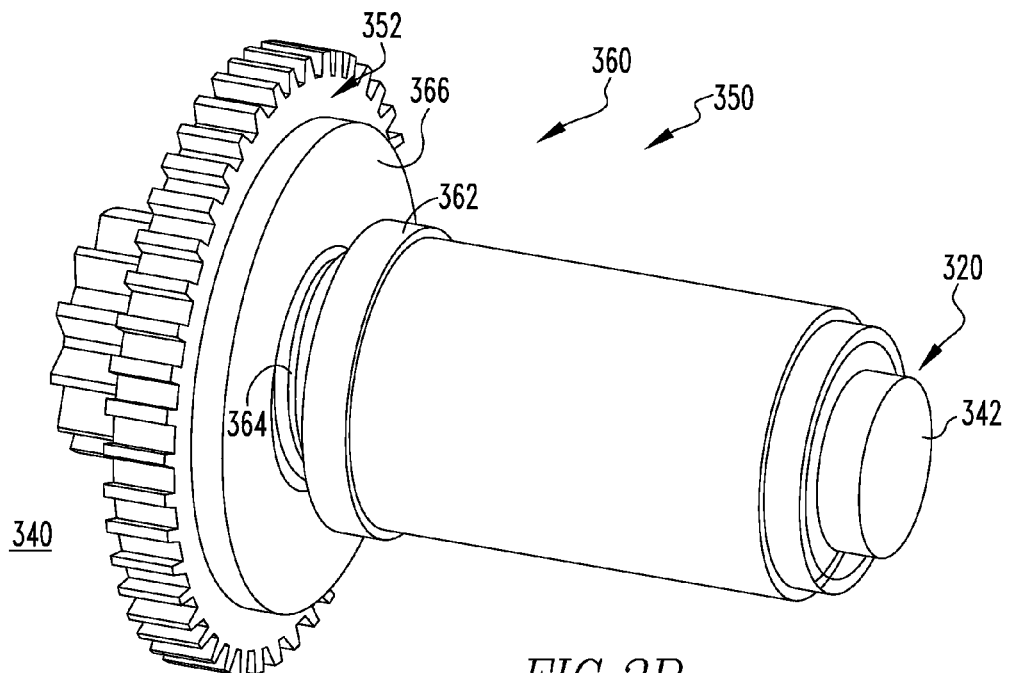
FIG. 3B is an isometric view of a torque regulator assembly for the stored energy assembly of FIG. 3A.

Referring to FIG. 3B, the torque regulator assembly 340 includes an intermediate shaft 342 and a drive assembly 350 located on the intermediate shaft 342. The drive assembly 350 includes a regulator gear 352 and a transfer assembly 360 located on the regulator gear 352. Furthermore, the intermediate shaft 342 extends through the regulator gear 352. In operation, the motor 304 (FIG. 3A) is structured to drive the driving pinion gear 306 and the corresponding regulator gear 352. Thus, the regulator gear 352 is cooperable with the motor 304 (FIG. 3A). Additionally, the stored energy assembly 300 (FIG. 3A) has a single-direction bearing 320 located in the middle of the intermediate shaft 342, which is structured to permit the gears 306, 308, 312, 352 (FIG. 3A) to be operable in one direction.

The transfer assembly 360 has a locking member (e.g., without limitation, latching ring 362) fixedly connected with the intermediate shaft 342. Furthermore, the transfer assembly 360 includes a spring 364 and a plate member 366, each located on the intermediate shaft 342. As seen, the plate member 366 is located between the regulator gear 352 and the latching ring 362. Additionally, the spring 364 connects the latching ring 362 to the plate member 366.

Figure 3C:
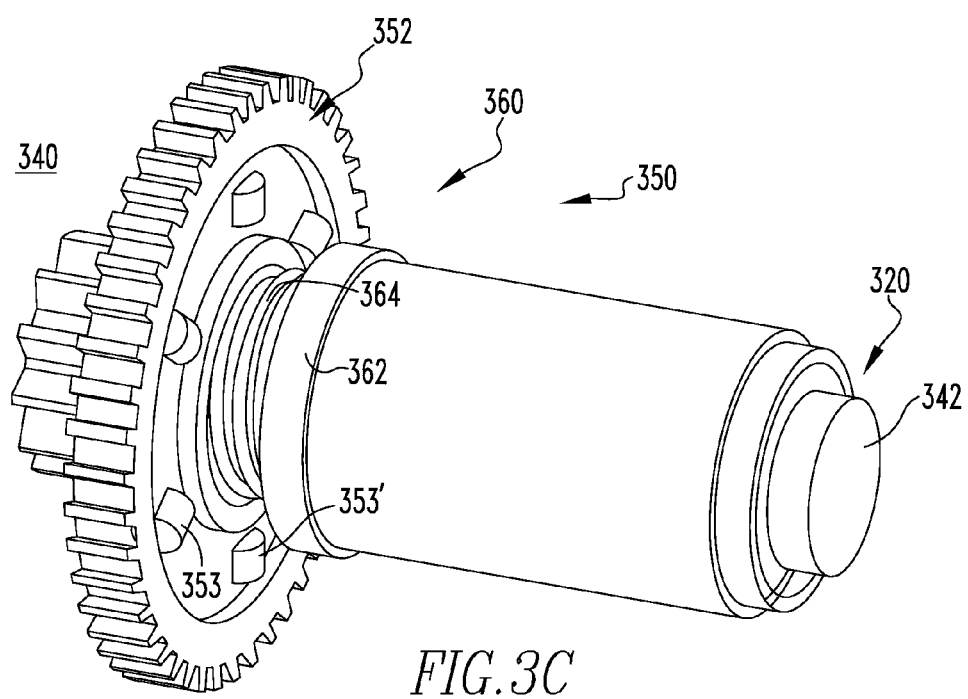
FIG. 3C is an isometric view of the torque regulator assembly of FIG. 3B, shown with a plate member removed to show hidden structures.
Figure 3D:
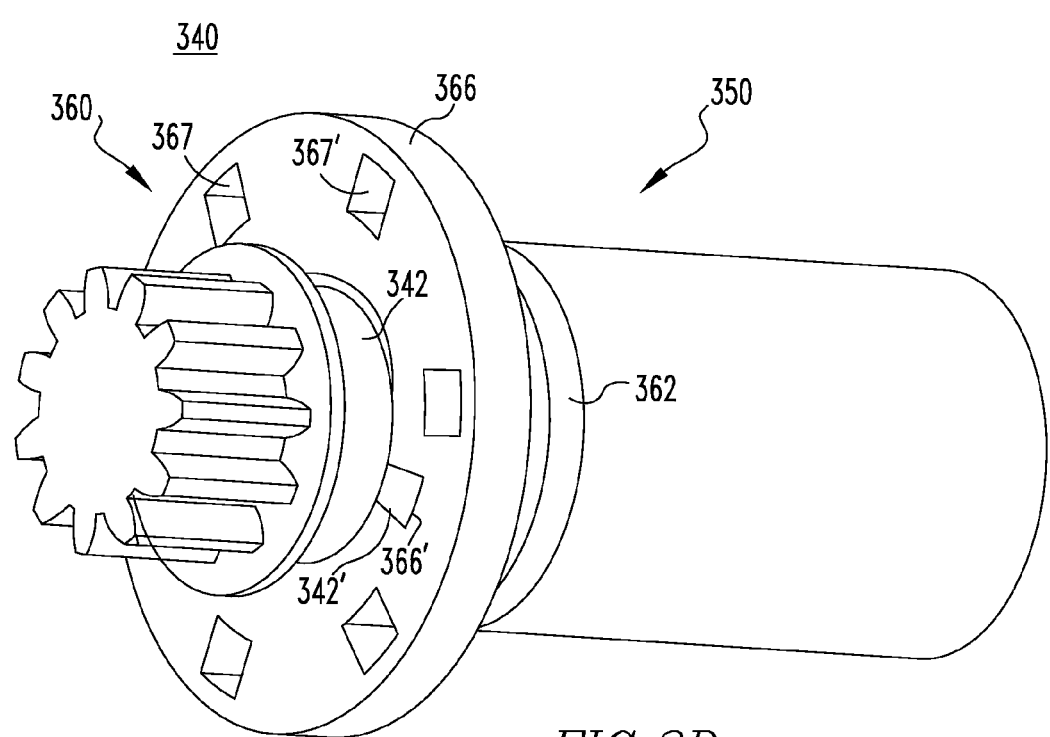
FIG. 3D is an isometric view of the torque regulator assembly of FIG. 3B, shown with a gear removed to show hidden structures.

Referring to FIG. 3C, which shows the torque regulator assembly 340 without the plate member 366, the regulator gear 352 includes a number of protrusions (e.g., without limitation, partially cylindrical-shaped tappets 353, 353'). Referring to FIG. 3D, which shows the torque regulator assembly 340 without the regulator gear 352, the plate member 366 has a number of recesses (e.g., without limitation, slots 367, 367'). Similar to the drive assemblies 150, 250 discussed hereinabove, the drive assembly 350 of the torque regulator assembly 340 is structured to move between a driving position and a non-driving position. In the driving position, the regulator gear 352 is cooperable with the transfer assembly 360 to drive the intermediate shaft 342. In the non-driving position, the regulator gear 352 is advantageously not cooperable with and rotates independently with respect to the transfer assembly 360.

More specifically, in the driving position, each of the tappets 353, 353' of the regulator gear 352 is located in a corresponding one of the slots 367, 367' of the plate member 366. Thus, friction between the plate member 366 and the regulator gear 352 causes the plate member 366 to rotate together with and at the same rotational velocity as the regulator gear 352, in the driving position. Additionally, although only two of the six tappets 353, 353' of the regulator gear 352 and two of the six slots 367, 367' of the plate member 366 are indicated, it will be appreciated that the torque regulator assembly 340 may employ any number, shape, size, and/or configuration of protrusions (not shown) and recesses (not shown) to perform the desired function of enabling the motor 304 to drive or not drive the intermediate shaft 342, without departing from the scope of the disclosed concept.

Furthermore, the plate member 366 is preferably slot-connected with the intermediate shaft 342. As seen in FIG. 3D, the plate member 366 includes a cutout 366' and the intermediate shaft 342 includes a protrusion 342' extending into the cutout 366'. Thus, the plate member 366 is structured to move longitudinally along the intermediate shaft 342. In this manner, the torque regulator assembly 340 may advantageously be reset automatically. For example and without limitation, as the plate member 366 is displaced longitudinally along the intermediate shaft 342 (e.g., as the plate member 366 slides along the protrusion 342'), displacement sensors (not shown) could send a signal to the motor 304 to stop charging, advantageously providing a mechanism to regulate the amount of energy transferred to the spiral spring 314. Furthermore, once the plate member 366 re-engages the regulator gear 352, the displacement sensors (not shown) could send a signal to the motor 304 to resume charging, advantageously resetting the torque regulator assembly 340. Additionally, the spring 364 is preferably fixedly connected (e.g., without limitation, slot-connected) with the plate member 366 and compressed against the latching ring 362. Accordingly, the fixed connection between the spring 364 and the plate member 366 causes the spring 364 to rotate together with the plate member 366 and the regulator gear 352, in the driving position.

Moreover, the spring 364 is also preferably fixedly connected (e.g., without limitation, slot-connected) with the latching ring 362. As a result, the latching ring 362 rotates together with the spring 364, the plate member 366, and the regulator gear 352, in the driving position. Because the latching ring 362 is fixedly connected with the intermediate shaft 342, as the latching ring 362 rotates, the intermediate shaft 342 rotates. Thus, in the driving position, the transfer assembly 360 advantageously enables the regulator gear 352 to drive the intermediate shaft 342.

The stored energy assembly 300 operates in a manner substantially similar to the stored energy assemblies 100, 200 (FIGS. 1A through 2) described hereinabove. The significant difference is in the torque regulator assembly 340. Thus, as the intermediate shaft 342 rotates, energy is transferred to and charges the spiral spring 314. However, the spiral spring 314, which has a predetermined torque limit, exerts a reaction torque on the intermediate shaft 342. As the spiral spring 314 is charged, the torque from the drive assembly 350 and the reaction torque from the spiral spring 114 exert opposing torques on the intermediate shaft 342. Furthermore, as the predetermined torque limit on the spiral spring 314 is reached, the reaction torque from the spiral spring 314 on the intermediate shaft 342 will exceed the torque from the drive assembly 350 on the intermediate shaft 342. At this moment, the drive assembly 350 advantageously moves from the driving position to the non-driving position.

In the non-driving position, because the torque from the drive assembly 350 on the intermediate shaft 342 cannot overcome the reaction torque from the spiral spring 314, the friction between the regulator gear 352 and the plate member 366 will be overcome and the regulator gear will rotate independently with respect to the transfer assembly 360. More specifically, the tappets 353, 353' will exit the slots 367, 367' and the regulator gear 352 will rotate independently with respect to and at a different rotational velocity than the plate member 366. Furthermore, because the plate member 366 is not driven by the regulator gear 352, each of the spring 364, the latching ring 362, and the intermediate shaft 342 will likewise not be driven by the regulator gear 352. It follows that in the non-driving position, the motor 304 (FIG. 3A) does not charge or transfer energy to the spiral spring 314 (FIG. 3A), whereas in the driving position the motor 304 does charge and transfer energy to the spiral spring 314. Thus, by employing the torque regulator assembly 340 in the stored energy assembly 300, additional energy is advantageously not transferred to the intermediate shaft 342 when the predetermined torque limit of the spiral spring 314 is reached. In other words, the torque regulator assembly 340 safely and reliably allows the motor 304 to transfer energy to and charge the spiral spring 314.

Additionally, it is within the scope of the disclosed concept for the torque regulator assembly 340 to replace either of the torque regulator assemblies 140, 240 (FIGS. 1A through 2) in the stored energy assemblies 100, 200 (FIGS. 1A through 2), without departing from the scope of the disclosed concept. Furthermore, the torque regulator assemblies 140, 240, 340 of the stored energy assemblies 100, 200, 300 may employ any known or suitable alternative size, shape, number and/or configuration of components to perform the desired function of regulating the amount of energy transferred from a charging mechanism (e.g., without limitation, motors 104, 204, 304) to a stored energy mechanism (e.g., without limitation, spiral springs 114, 214, 314), without departing from the scope of the disclosed concept. Moreover, it will be appreciated that the stored energy assemblies 100, 200, 300 may employ any known or suitable alternative charging mechanism (e.g., without limitation, manual charging mechanism including a charging handle (not shown)) and/or stored energy mechanism (not shown), without departing from the scope of the disclosed concept.

Accordingly, it will be appreciated that the disclosed concept provides for an improved (e.g., without limitation, safer, more reliable, more compact) electrical switching apparatus (e.g., without limitation, medium voltage vacuum circuit breaker 2), and stored energy assembly 100, 200, 300 and torque regulator assembly 140, 240, 340 therefor, which among other benefits, provides a mechanism for regulating the amount of energy transferred from a charging mechanism (e.g., without limitation, motors 104, 204, 304) to a stored energy mechanism (e.g., without limitation, spiral springs 114, 214, 314).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A torque regulator assembly for a stored energy assembly of an electrical switching apparatus, said electrical switching apparatus comprising a housing, separable contacts, and an operating mechanism for opening and closing said separable contacts, said stored energy assembly comprising a mount removably coupled to said housing, a transmission assembly disposed on said mount and comprising a stored energy mechanism, and at least one charging mechanism structured to charge said stored energy mechanism in order to store energy, said torque regulator assembly comprising:
   a drive assembly comprising a gear and a transfer assembly disposed on said gear, said gear being structured to be cooperable with said at least one charging mechanism; and
   a shaft extending through said gear,
   wherein said drive assembly is structured to move between a driving position and a non-driving position,
   wherein in said driving position, said gear is cooperable with said transfer assembly to drive said shaft, and
   wherein in said non-driving position, said gear rotates independently with respect to said transfer assembly.

2. The torque regulator assembly of claim 1 wherein said transfer assembly comprises a number of transfer components disposed on said shaft and a locking member connected with said shaft; and wherein said number of transfer components are disposed between said gear and said locking member.

3. The torque regulator assembly of claim 2 wherein said number of transfer components comprises a friction facing disposed on said gear, a spring, and a plate member disposed between said friction facing and said spring; and wherein said spring is disposed between said locking member and said plate member.

4. The torque regulator assembly of claim 3 wherein said transfer assembly further comprises a hub component and another friction facing; wherein said another friction facing is disposed between said hub component and said gear; wherein said gear is disposed between said friction facing and said another friction facing; wherein in said driving position, said gear and each of said friction facings rotate together; and wherein in said non-driving position, said gear rotates independently with respect to each of said friction facings.

5. The torque regulator assembly of claim 4 wherein said locking member is a nut, said nut being threadably connected with said shaft; and wherein said spring is a disc spring.

6. The torque regulator assembly of claim 5 wherein said number of transfer components further comprises a washer disposed between said disc spring and said nut.

7. The torque regulator assembly of claim 2 wherein said number of transfer components comprises a plate member, a spring disposed between said plate member and said locking member, and a bearing disposed between said plate member and said gear.

8. The torque regulator assembly of claim 7 wherein said bearing comprises a number of balls; wherein said gear has a number of partially spherical shaped grooves each structured to receive a corresponding one of said balls; wherein in said driving position, each of said balls is disposed in a corresponding one of said grooves; and wherein in said non-driving position, said gear rotates independently with respect to said bearing.

9. The torque regulator assembly of claim 8 wherein said transfer assembly further comprises a hub component; wherein said gear is disposed between said hub component and said bearing; wherein said locking member is a nut threadably connected with said shaft; wherein said nut has a slot; wherein said spring has an end portion disposed in said slot; wherein said bearing has a cylindrical shaped cutout having a diameter; wherein said plate member has an outer diameter substantially the same as said diameter of said cutout; and wherein said plate member is disposed in said cutout.

10. The torque regulator assembly of claim 2 wherein said number of transfer components comprises a plate member and a spring; wherein said plate member is disposed between said locking member and said gear; and wherein said spring connects said plate member to said locking member.

11. The torque regulator assembly of claim 10 wherein said plate member is slot-connected with said shaft.

12. The torque regulator assembly of claim 10 wherein said plate member has a number of recesses; wherein said gear comprises a number of protrusions; wherein in said driving position, each of said protrusions is disposed in a corresponding one of said recesses; and wherein in said non-driving position, said gear rotates independently with respect to said plate member.

13. The torque regulator assembly of claim 12 wherein said number of recesses is a plurality of slots; and wherein said number of protrusions is a plurality of tappets.

14. A stored energy assembly for an electrical switching apparatus comprising a housing, separable contacts, and an operating mechanism for opening and closing said separable contacts, said stored energy assembly comprising:
a mount structured to be removably coupled to said housing;
a transmission assembly disposed on said mount, said transmission assembly comprising a stored energy mechanism; and
at least one charging mechanism for charging said stored energy mechanism in order to store energy; and
a torque regulator assembly comprising:
    a drive assembly comprising a gear and a transfer assembly disposed on said gear, said gear being cooperable with said at least one charging mechanism, and
    a shaft extending through said gear,
wherein said drive assembly is structured to move between a driving position and a non-driving position,
wherein in said driving position, said gear is cooperable with said transfer assembly to drive said shaft;
wherein in said non-driving position, said gear rotates independently with respect to said transfer assembly;
wherein said transmission assembly further comprises another gear cooperable with said torque regulator assembly, a main shaft, and a number of cams cooperable with said main shaft and structured to be cooperable with said operating mechanism; and wherein said main shaft extends through said another gear and said stored energy mechanism.

15. The stored energy assembly of claim 14 wherein in said driving position, said at least one charging mechanism charges said stored energy mechanism; and wherein in said non-driving position, said at least one charging mechanism does not charge said stored energy mechanism.

16. The stored energy assembly of claim 15 wherein said stored energy mechanism is a spiral spring; wherein said spiral spring has a predetermined torque limit; and wherein, when said predetermined torque limit is reached, said drive assembly moves from said driving position to said non-driving position.

17. The stored energy assembly of claim 14 wherein said mount is disposed between said gear and said another gear.

18. An electrical switching apparatus comprising:
a housing;
separable contacts;
an operating mechanism for opening and closing said separable contacts; and
a stored energy assembly comprising:
    a mount removably coupled to said housing,
    a transmission assembly disposed on said mount and comprising a stored energy mechanism,
    at least one charging mechanism structured to charge said stored energy mechanism in order to store energy, and
    a torque regulator assembly comprising:
        a drive assembly comprising a gear and a transfer assembly disposed on said gear, said gear being cooperable with said at least one charging mechanism, and
        a shaft extending through said gear,
    wherein said drive assembly is structured to move between a driving position and a non-driving position,
    wherein in said driving position, said gear is cooperable with said transfer assembly to drive said shaft,
    wherein in said non-driving position, said gear rotates independently with respect to said transfer assembly,
    wherein said transmission assembly further comprises another gear cooperable with said torque regulator assembly, a main shaft, and a number of cams cooperable with said main shaft and cooperable with said operating mechanism, and
    wherein said main shaft extends through said another gear and said stored energy mechanism.

19. The electrical switching apparatus of claim 18 wherein said electrical switching apparatus is a medium voltage vacuum circuit breaker.

* * * * *